US005489065A

United States Patent [19]

Nally, Jr.

[11] Patent Number: 5,489,065

[45] Date of Patent: Feb. 6, 1996

[54] THIN DISK ORIFICE MEMBER FOR FUEL INJECTOR

[75] Inventor: John F. Nally, Jr., Williamsburg, Va.

[73] Assignee: Siemens Automotive L.P., Auburn Hills, Mich.

[21] Appl. No.: 269,405

[22] Filed: Jun. 30, 1994

[51] Int. Cl.[6] .......... G05B 1/14

[52] U.S. Cl. .......... 239/552; 239/596

[58] Field of Search .......... 239/596, 533.2, 239/88–96, 552, 556, 543

[56] References Cited

U.S. PATENT DOCUMENTS

| | | | |
|---|---|---|---|
| 3,128,048 | 4/1964 | Denure | 239/596 |
| 4,317,542 | 3/1982 | Morishita et al. | 239/533.2 |
| 4,365,756 | 12/1982 | Fisher | 239/533.2 |
| 4,907,748 | 3/1990 | Gardner et al. | 239/596 |

FOREIGN PATENT DOCUMENTS

| | | | |
|---|---|---|---|
| 0135075 | 10/1981 | Japan | 239/596 |
| 670138 | 5/1989 | Switzerland | 239/533.2 |

*Primary Examiner*—Andres Kashnikow
*Assistant Examiner*—Lisa Douglas
*Attorney, Agent, or Firm*—Russel C. Wells

[57] ABSTRACT

A thin disk orifice member having fuel metering orifices located on flat planar surfaces extending from the disk surface, The flat planar surfaces from sides of an enclosed structure having three or more sides, The structure may be in one position extending from the disk surface in the direction of the outlet of the injector or may be inverted. The orifices direct the fuel flow in various streams or sprays to individual cylinders of the engine.

44 Claims, 2 Drawing Sheets

THIN DISK ORIFICE MEMBER FOR FUEL INJECTOR

FIELD OF THE INVENTION

This invention relates generally to electrically operated fuel injectors of the type that inject volatile liquid fuel into an induction intake system of an automotive vehicle internal combustion engine, and in particular the invention relates to a novel thin disk orifice member for such a fuel injector.

BACKGROUND AND SUMMARY OF THE INVENTION

Commonly assigned U.S. Pat. No. 4,854,024 discloses a thin disk orifice member that has a centrally disposed, conically walled dimple which contains one or more metering orifices through which liquid fuel is injected from the injector. The manufacturing process for that thin disk orifice member comprises forming the conical wall after the orifices have been created, and while that process would certainly be considered a precision one with very tight tolerances, variations within even such small tolerance ranges have in some cases been found to influence the quality of an injection spray or stream in a way that has a detrimental effect on tailpipe exhaust emissions from a vehicle.

It is believed fair to say that in today's automotive industry a fuel injector must be designed to accommodate a particular engine, not vice versa. The ability to meet stringent tailpipe emission standards for mass-produced automotive vehicles is at least in part attributable to the ability to assure consistency in both shaping and aiming the injection spray or stream toward the intake valve or valves. Wall wetting is to be avoided.

Because of the large number of different engine models that use multi-point fuel injectors, a large number of unique injectors are needed to provide the desired shaping and aiming of the injection spray or stream for each cylinder of an engine. To accommodate these demands, fuel injectors have heretofore been designed to produce straight streams, bent streams, split streams, and split/bent streams. In fuel injectors utilizing thin disk orifice members such as those described above with reference to the commonly assigned patent whose number was mentioned, such injection patterns can be created by solely by the specific design of the thin disk orifice member. This capability offers the opportunity for meaningful manufacturing economies since other components of the fuel injector do not necessarily have to have a unique design for a particular application, i.e. many other components can be of common design.

The present invention relates to novel forms of thin disk orifice members that can enhance the ability to meet different and/or more stringent demands with equivalent or even improved consistency. For example, certain thin disk orifice members according to the invention are well-suited for engines in which a single fuel injector is required to direct sprays or stream to four individual intake valves; and thin disk orifice members according to the invention can satisfy difficult installations where space for mounting the fuel injector is severely restricted due to packaging constraints. One of the advantages of the invention arises because the metering orifices are located in flat planar surfaces. This has been found important in providing enhanced flow stability for proper interaction with upstream flow geometries internal to the fuel injector. The presence of a metering orifice in a non-planar surface, such as in a conical dimple, may be unable to consistently achieve the degree of enhanced flow stability that is achieved by its disposition on a flat planar surface as in the present invention. The present invention is further characterized by the particular shapes for the indentation that contains the flat planar surfaces having the metering orifices. A given thin disk orifice member embodying principles of the invention may provide increased fuel injector versatility by being capable of installation in the nozzle of a fuel injector in either an inverted or in a non-inverted orientation.

The foregoing, along with additional features, advantages, and benefits of the invention, will be seen in the ensuing description and claims which are accompanied by drawings. The drawings disclose a presently preferred embodiment of the invention according to the best mode contemplated at this time in carrying out the invention.

DESCRIPTION OF THE PREFERRED EMBODIMENT

Figure 1:
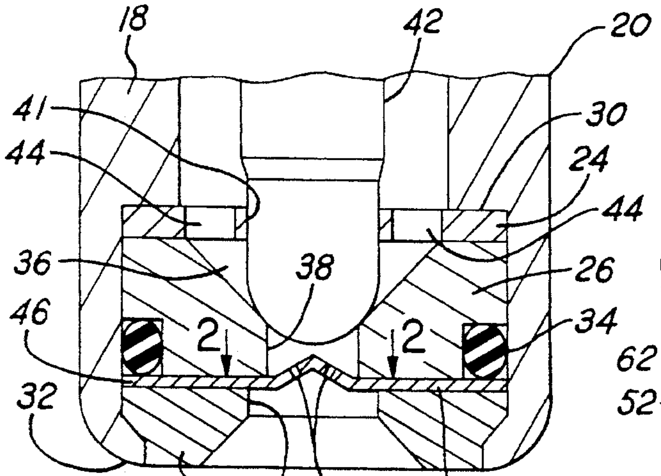
FIG. 1 is fragmentary longitudinal cross-sectional view through the nozzle end of a fuel injector embodying a thin disk orifice member according to the present invention.

FIG. 1 shows the nozzle end of a body 18 of a solenoid operated fuel injector 20 having a thin disk orifice member 22 embodying principles of the invention. The construction of fuel injector 20 is generally like that disclosed in commonly assigned U.S. Pat. Nos. 4,854,024 and 5,174,505 with respect to details that are not specifically portrayed in FIG. 1. The nozzle end of fuel injector 20 is also like those of the aforementioned patents in that a stack comprising a needle guide member 24 and a valve seat member 26 are disposed axially interiorally of member 22, while an annular retainer member 28 is disposed exteriorly of member 22, and the entire stack is axially captured in the nozzle end between an internal shoulder 30 of body 18 and a short inwardly turned lip 32 at the end of the body. The O.D. of the stack is sealed to the I.D. wall of the body by the usual O-ring seal 34.

Seat member 26 comprises a frustoconical seat 36 that leads from guide member 24 to a central passage 38 of member 26 that in turn leads to a central region of member 22. Retainer member 28 comprises a passage 40 from member 22 that opens to the open end of the nozzle. Guide member 24 comprises a central guide hole 41 for guiding the axial reciprocation of a needle 42 and several through-holes 44 distributed around hole 40 to provide for fuel to flow through member 24 to the space around seat 36. The arrows in FIG. 1 show the direction of fuel flow although it can be seen in that FIG. that the rounded tip end of needle 42 is seated on seat 36 closing the fuel injector to flow. When needle 42 is unseated, fuel passes to passage 38, through orifice means in member 22 and, through passage 40 to be injected from the nozzle into an induction intake system of an internal combustion engine.

Figure 2:
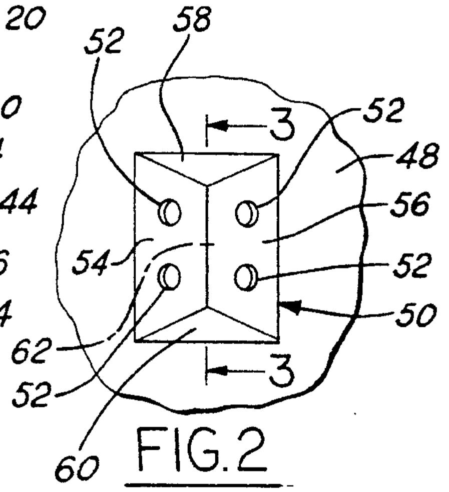
FIG. 2 is a fragmentary view of the thin disk orifice member by itself, as taken in the direction of arrows 2—2 in FIG. 1.
Figure 3:
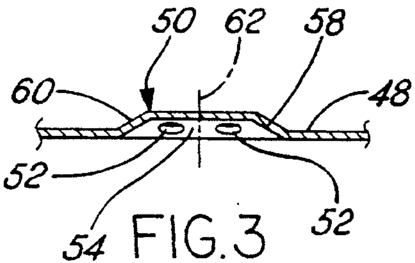
FIG. 3 is a cross-sectional view in the direction of arrows 3—3 in FIG. 2.

As noted earlier, the invention relates to the novel construction of member 22, full detail of which can be seen by also considering FIGS. 2 and 3. Member 22 has a basically circular shape comprising a circular outer margin 46 that circumferentially bounds the central region that is disposed axially in the fuel injector between passage 38 and passage 40. In the illustrated embodiment, the entrapment of margin 46 in the stack provides means for securely mounting member 22 in the nozzle end of the fuel injector.

The central region of member 22 comprises an annular zone 48 immediately radially inwardly of margin 46 and an indentation 50 that is bounded by zone 48. The central region of member 22 is imperforate except for the presence of one or more through-orifices via which fuel passes through member 22. The embodiment of FIGS. 1–3 comprises four such through-orifices 52, and it can be seen that these orifices are contained solely in indentation 50 between passage 38 and passage 40.

The particular shape of indentation 50 is significant. One might refer to this particular shape by the term "chisel point". It comprises four polygonally shaped, flat planar walls, each of which occupies a respective plane that is non-parallel to the planes occupied by the other walls. Two of the walls 54, 56 are trapezoidal in shape and may be considered as side walls. The remaining two walls, 58, 60 are triangular in shape and may be considered as end walls. Each of the four walls 54, 56, 58 and 60 has a respective base that joins with zone 48 so as to lie generally in a plane that is perpendicular to the main longitudinal axis 62 of member 22, which also happens to be co-axial with the main axis of the fuel injector in FIG. 1. Respective sides of the triangular end walls 58, 60 join with respective sides of the trapezoidal side walls 54, 56. The upper bases of the trapezoidal walls 54, 56 are substantially coincident, coming together as a common side which lies on an imaginary line which is perpendicular to and intersects axis 62. The apex of each triangular end wall 58, 60 is also coincident with a respective end of the coincident upper bases of the trapezoidal side walls. In this embodiment, the two trapezoidal walls are congruent, and the two triangular end walls are congruent.

FIG. 1 shows member 22 with indentation 50 in what is deemed "inverted" position. Since through-orifices 52 are arranged in a pattern where each is directly opposite a corresponding orifice in the opposite trapezoidal wall, the fuel streams from each pair of directly opposite orifices will impinge a short distance after they have exited the orifices. If member 22 were to be turned upside down to what is deemed "non-inverted" position, the streams from one trapezoidal wall would diverge from those from the opposite trapezoidal wall.

Figure 4:
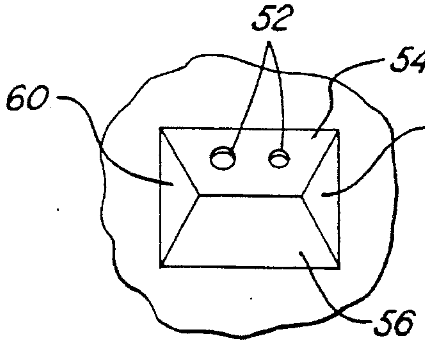
FIG. 4 is a view similar to FIG. 2 showing a second embodiment.

FIGS. 4–7 display other possible orifice patterns. FIG. 4 shows a pattern in which there are two orifices in wall 54 but none in wall 56. This would produce a parallel bent stream pattern for the member installed in either inverted or non-inverted position.

Figure 5:
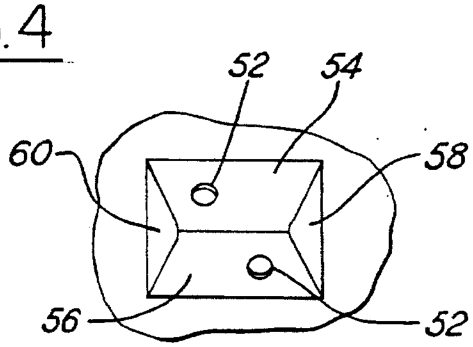
FIG. 5 is a view similar to FIG. 2 showing a third embodiment.

FIG. 5 shows a pattern where each trapezoidal wall contains only a single orifice, but the two orifices are not directly across from each other. One orifice is in the half of its trapezoidal wall that is nearer a particular one of the triangular end walls while the orifice that is in the other trapezoidal wall is in the half of that wall that is more distant from that one particular triangular end wall. This member will produce split streams that do not impinge each other regardless of whether it is installed inverted or non-inverted.

Figure 6:
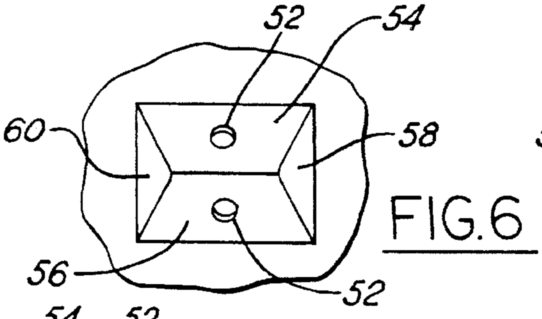
FIG. 6 is a view similar to FIG. 2 showing a fourth embodiment.

FIG. 6 shows an embodiment in which each trapezoidal wall contains a single orifice directly across from the other. When this is used in non-inverted position, it will produce split streams. When it is used in inverted position, the streams will impinge each other.

Figure 7:
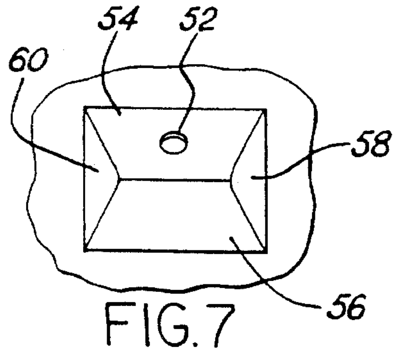
FIG. 7 is a view similar to FIG. 2 showing a fifth embodiment.

FIG. 7 shows an embodiment in which a single orifice is disposed in the center of one trapezoidal wall while the other trapezoidal wall is imperforate. This will produce a single bent stream.

Figure 9:
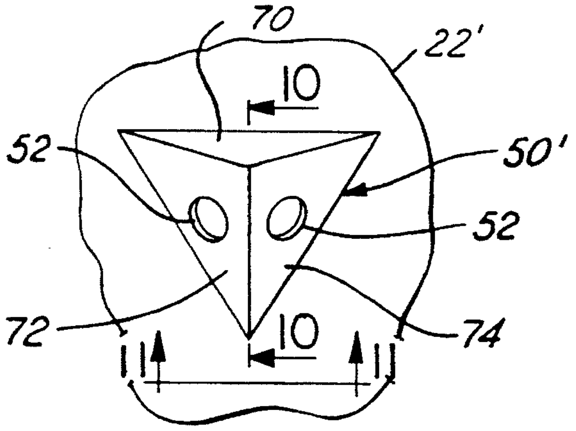
FIG. 9 is a view similar to FIG. 2 showing a sixth embodiment.
Figure 10:
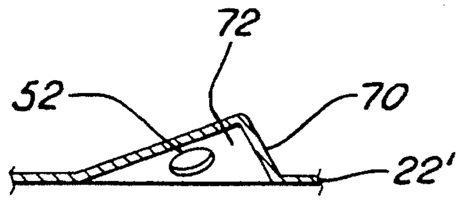
FIG. 10 is a cross-sectional view as taken in the direction of arrows 10—10 in FIG. 9.
Figure 11:
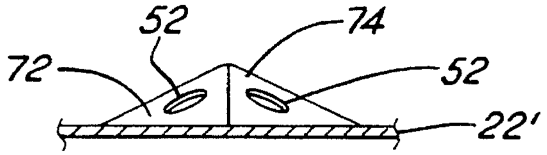
FIG. 11 is a view in the direction of arrows 11—11 in FIG. 9.

FIGS. 9, 10 and 11 portray another embodiment of thin disk orifice member designated as 22'. This embodiment is like member 22 except for the shape of the indentation in the central region which in FIGS. 9–11 is designated 50'. Indentation 50' is in the shape of a pyramid comprising three triangular shaped walls 70, 72 and 74. Each triangular wall is flat and planar, having a base that joins with zone 48 so as to lie in a plane that is generally perpendicular to the longitudinal axis of member 22'. Respective sides of each one of the walls 70, 72, 74 join with respective sides of the other two walls so that the three apices of the triangles come together at a common point. Wall 70 is imperforate while each wall 72, 74 contains a single orifice 52. The two walls 72, 74 are congruent and each orifice is located at the same relative location in each. Wall 70 is not congruent with either wall 72 or 74. If member 22' is installed in the inverted position, the streams from the respective orifices will impinge. If member 22' is installed in non-inverted position, the streams will diverge. The extent with which the streams are bent (i.e. the angle of the stream in relation to the axis of the fuel injector) is determined by the relative sizes of the respective walls. This non-inverted installation produces a bent split stream pattern.

In all embodiments the walls which contain the orifices are flat planar walls. As explained earlier, this is important in enhancing the flow characteristic through the orifice. The members 22, 22' can be fabricated using steps like those described in U.S. Pat. No. 4,854,024, but the walls that contain the orifices must be flat and planar.

Figure 8:
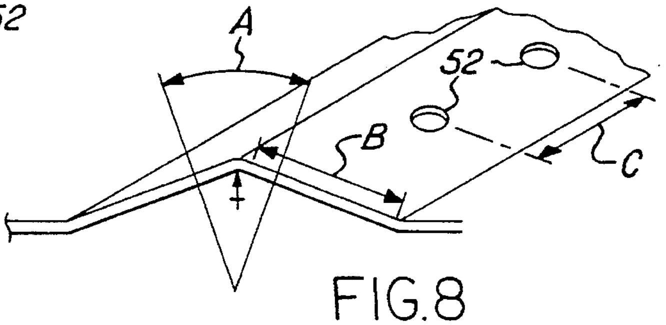
FIG. 8 is a diagrammatic view in the same direction as the view of FIG. 1 to show certain relationships relevant to the thin disk orifice member.

FIG. 8 is intended to depict an angular relationship between the two trapezoidal walls by the reference A. For example, this may be 5, 10, 20, or 30 degrees. The symbol B represents the minimum height between the upper and lower bases of a trapezoid for an orifice having a diameter 0.015 inch. The symbol C represents the minimum length for two 0.015 inch orifices. It is to be appreciated that the drawing FIGS. are intended to be representative of principles of the invention and therefore should not necessarily be construed to be to any particular size or relative proportions. Thin disk orifice members embodying the present invention are preferably fabricated in accordance with methodology disclosed in U.S. Pat. No. 4,854,024.

What is claimed is:

1. A thin disk orifice member through which fuel is injected from a fuel injector, said thin disk orifice mender comprising a thin disk having an imaginary main longitudinal axis and a circumferentially extending margin spaced radially outward of said axis and adapted for mounting said disk on a nozzle end of a fuel injector, said margin circumferentially bounding a central region of the disk that is imperforate except for the presence of one or more through-orifices via which fuel passes through the thin disk, said central region comprising a radially outer annular zone that is nominally perpendicular to said axis and circumferentially bounds an inner zone, said inner zone comprising an indentation that contains said one or more through-orifices and that is formed in said disk as at least three polygonally shaped walls, each of which occupies a respective plane that is non-parallel to the planes occupied by the other walls, wherein a first of said walls is triangular in shape and has a base that lies in a plane perpendicular to said axis, an apex that is spaced axially of said base, and respective sides that adjoin respective sides of a second and a third of said walls.

2. A thin disk orifice member as set forth in claim 1 in which said first wall is imperforate.

3. A thin disk orifice member as set forth in claim 2 in which said one or more through-orifices is contained in at least one of said second and third walls.

4. A thin disk orifice member as set forth in claim 3 in which said one or more through-orifices is contained in both said second and third walls.

5. A thin disk orifice member as set forth in claim 4 in which each of said second and third walls is trapezoidal in shape having a respective lower base that lies in the same plane perpendicular to said axis as the base of said first wall and a respective upper base that is parallel to the respective lower base.

6. A thin disk orifice member as set forth in claim 5 in which said respective upper bases of said second and third walls are substantially coincident.

7. A thin disk orifice member as set forth in claim 6 in which said apex of said first wall is substantially coincident with one end of said upper bases of said second and third walls.

8. A thin disk orifice member as set forth in claim is 6 in which said indentation is formed to also have a fourth wall that is triangular in shape and substantially congruent with the triangular shape of said first wall, said fourth wall has a base that lies in the same plane perpendicular to said axis as the bases of said first, second, and third walls, said fourth wall further has an apex that is spaced axially of its base and respective sides that adjoin respective sides of said second and third of said walls that are opposite the respective sides of said second and third walls that adjoin the respective sides of said first wall.

9. A thin disk orifice member as set forth in claim 8 in which said apex of said fourth wall is substantially coincident with one end of said upper bases of said second and third walls.

10. A thin disk orifice member as set forth in claim 9 in which said apex of said first wall is substantially coincident with another end of said upper bases of said second and third walls.

11. A thin disk orifice member as set forth in claim 5 in which said one or more through-orifices comprises two through-orifices in said second wall and two through-orifices in said third wall.

12. A thin disk orifice member as set forth in claim 11 in which centers of said two through-orifices in said second wall lie on an imaginary line that is parallel to the base of said second wall, and centers of said two through-orifices in said third wall lie on an imaginary line that is parallel to the base of said third wall.

13. A thin disk orifice member as set forth in claim 12 in which the distance between said two through-orifices in said second wall is the same as the distance between said two through-orifices in said third wall.

14. A thin disk orifice member as set forth in claim 13 in which the centers of said two through-orifices in said second wall and the centers of said two through-orifices in said third wall lie at corners of an imaginary rectangle as viewed axially of said thin disk.

15. A thin disk orifice member as set forth in claim 5 in which said one or more through-orifices comprises a single through-orifice in said second wall and a single through-orifice in said third wall.

16. A thin disk orifice member as set forth in claim 15 in which each of said single through-orifices is equidistant from said first wall.

17. A thin disk orifice member as set forth in claim 16 in which each of said single through-orifices is disposed substantially at the center of its respective wall.

18. A thin disk orifice member as set forth in claim 15 in which each of said single through-orifices is at a different distance from said first wall than the other of said single through-orifices.

19. A thin disk orifice member as set forth in claim 18 in which the single through- orifice in said second wall is disposed in a half of said second wall that adjoins said first wall and the single through-orifice in said third wall is disposed in a half of said third wall that does not adjoin said first wall.

20. A thin disk orifice member as set forth in claim 5 in which said one or more through-orifices comprises a single through-orifice in said second wall and said third wall being imperforate.

21. A thin disk orifice member as set forth in claim 5 in which said one or more through-orifices comprises two through-orifices in said second wall and said third wall being imperforate.

22. A thin disk orifice member as set forth in claim 4 in which each of said second and third walls is triangular in shape having a respective base that lies in the same plane perpendicular to said axis as the base of said first wall and a respective apex spaced axially of the respective base, the apices of said first, second, and third walls are substantially coincident, and a further side of said second wall adjoins a further side of said third wall.

23. A thin disk orifice member as set forth in claim 22 in which said one or more through-orifices comprises a single through-orifice in said second wall and a single through-orifice in said third wall.

24. A thin disk orifice member as set forth in claim 22 in which the triangular shape of said second wall is substantially congruent with the triangular shape of said third wall, and the triangular shape of said first wall is non-congruent with the respective triangular shapes of said second and third walls.

25. A thin disk orifice member as set forth in claim 24 in which said one or more through-orifices comprises a single through-orifice in said second wall and a single through-orifice in said third wall.

26. A thin disk orifice member through which fuel is injected from a fuel injector, said thin disk orifice member comprising a thin disk having an imaginary main longitudinal axis and a circumferentially extending margin spaced radially outward of said axis and adapted for mounting said disk on a nozzle end of a fuel injector, said margin circumferentially bounding a central region of the disk that is imperforate except for the presence of one or more through-orifices via which fuel passes through the thin disk, said central region comprising an indentation in the form of a three-sided pyramid that contains said one or more through-orifices, the height of said pyramid being in the axial direction.

27. A thin disk orifice member as set forth in claim 26 in which said one or more through-orifices comprises a single through-orifice in a first side of said pyramid and a single through-orifice in a second side of said pyramid.

28. A thin disk orifice member as set forth in claim 27 in which a third side of said pyramid is imperforate.

29. A thin disk orifice member through which fuel is injected from a fuel injector, said thin disk orifice member comprising a thin disk having an imaginary main longitudinal axis and a circumferentially extending margin spaced radially outward of said axis and adapted for mounting said disk on a nozzle end of a fuel injector, said margin circumferentially bounding a central region of the disk that is imperforate except for the presence of one or more through-orifices via which fuel passes through the thin disk, said central region comprising an indentation having two multi-sided planar walls that contain said one or more through-orifices and that substantially share a common side that is disposed transverse to said axis, said walls falling away from each other at said common side at an obtuse angle to each other as viewed lengthwise of said common side.

30. A thin disk orifice member as set forth in claim 29 in which said common side is perpendicular to and passes through said axis.

31. A thin disk orifice member as set forth in claim 29 in which said two walls are substantially identical in size and shape.

32. A thin disk orifice member as set forth in claim 29 in which said two walls are four-sided polygons.

33. A thin disk orifice member as set forth in claim 32 in which said two walls are trapezoids.

34. A thin disk orifice member as set forth in claim 29 in which said one or more through-orifices comprises at least one through-orifice in a first of said two walls and at least one through-orifice in a second of said two walls.

35. A thin disk orifice member as set forth in claim 34 in which said one or more through-orifices comprises a single through-orifice in said first wall and a single through-orifice in said second wall.

36. A thin disk orifice member as set forth in claim 35 in which each of said single through-orifices is disposed substantially at the center of its respective wall.

37. A thin disk orifice member as set forth in claim 35 in which each of said single through-orifices is offset from the other in a direction lengthwise of said common side.

38. A thin disk orifice member as set forth in claim 37 in which the single through-orifice in said first wall is disposed in a half of said first wall that is not co-extensive lengthwise of said common side with a half of said second wall which contains the single through-orifice in said second wall.

39. A thin disk orifice member as set forth in claim 34 in which said one or more through-orifices comprises two through-orifices in said first wall and two through-orifices in said second wall.

40. A thin disk orifice member as set forth in claim 39 in which centers of said two through-orifices in said first wall lie on an imaginary line that is parallel to said common side, and centers of said two through-orifices in said second wall lie on an imaginary line that is parallel to said common side.

41. A thin disk orifice member as set forth in claim 40 in which the distance between said two through-orifices in said first wall is the same as the distance between said two through-orifices in said second wall.

42. A thin disk orifice member as set forth in claim 41 in which the centers of said two through-orifices in said first wall and the centers of said two through-orifices in said second wall lie at corners of an imaginary rectangle as viewed axially of said thin disk.

43. A thin disk orifice member as set forth in claim 29 in which said one or more through-orifices comprises a single through-orifice in said a first of said walls and a second of said walls being imperforate.

44. A thin disk orifice member as set forth in claim 29 in which said one or more through-orifices comprises two through-orifices in a first of said walls and a second of said walls being imperforate.

* * * * *